United States Patent
Shimazu et al.

(10) Patent No.: US 8,178,006 B2
(45) Date of Patent: May 15, 2012

(54) FIBER AGGREGATE AND FABRICATING METHOD OF THE SAME

(75) Inventors: Tomohiro Shimazu, Kariya (JP); Yoshinobu Suzuki, Aichi (JP); Hisayoshi Oshima, Obu (JP)

(73) Assignee: DENSO CORPORATION, Kariya (JP)

( * ) Notice: Subject to any disclaimer, the term of this patent is extended or adjusted under 35 U.S.C. 154(b) by 462 days.

(21) Appl. No.: 12/389,654

(22) Filed: Feb. 20, 2009

(65) Prior Publication Data

US 2009/0230353 A1  Sep. 17, 2009

(30) Foreign Application Priority Data

Mar. 14, 2008 (JP) ................................ 2008-066137

(51) Int. Cl.
*H01B 1/04* (2006.01)
*H01B 1/06* (2006.01)
*H01B 1/02* (2006.01)

(52) U.S. Cl. ..................... 252/502; 252/506; 252/520.22

(58) Field of Classification Search .................. 252/500, 252/502, 506, 520.22; 429/221
See application file for complete search history.

(56) References Cited

U.S. PATENT DOCUMENTS

| | | |
|---|---|---|
| 2002/0146562 A1 | 10/2002 | Morita et al. |
| 2004/0053780 A1 | 3/2004 | Jiang et al. |
| 2005/0095938 A1* | 5/2005 | Rosenberger et al. ........ 442/194 |
| 2006/0147692 A1 | 7/2006 | Kmetz |
| 2007/0166223 A1 | 7/2007 | Jiang et al. |
| 2008/0095694 A1 | 4/2008 | Nakayama et al. |

FOREIGN PATENT DOCUMENTS

| | | |
|---|---|---|
| JP | A-2000-109306 | 4/2000 |
| JP | 2004-218144 A | 8/2004 |
| JP | 2004-231442 A | 8/2004 |

OTHER PUBLICATIONS

Golberg et al., "Multi- and Single-Walled Boron Nitride Nanotubes Produced From Carbon Nanotubes by a Substitution Reaction," Mat. Res. Soc. Symp. Proc., 593, pp. 27-32 (2000).*
Suenaga et al., "Synthesis of Nanoparticle and Nanotubes with Well-Separated Layers of Boron Nitride and Carbon," Science, 278, pp. 653-655 (Oct. 24, 1997).*
Notification of Reason(s) for Rejection issued on Mar. 2, 2010 by the Japan Patent Office in corresponding Japanese Application No. 2008-066137 (English translation enclosed).
Notification of Reasons for Rejection mailed on May 18, 2010 by the Japan Patent Office in corresponding Japanese Application No. 2008-066137 (English translation enclosed).

* cited by examiner

*Primary Examiner* — Mark Kopec
*Assistant Examiner* — Jaison Thomas
(74) *Attorney, Agent, or Firm* — Posz Law Group, PLC (57) ABSTRACT

A fiber aggregate contains fine carbon fibers and fine boron nitride fibers. Desirably the boron nitride fibers form an outer layer portion of the fiber aggregate and the fine carbon fibers form a core portion of the fiber aggregate. Desirably the fine carbon fibers and the fine boron nitride fibers are twisted with each other. Desirably the fine carbon fibers are carbon nanotubes and the fine boron nitride fibers are boron nitride nanotubes. Desirably the fiber aggregate further contains boron-containing fine carbon fibers. The fine boron nitride fibers are formed by substituting carbon atoms of fine carbon fibers by boron atoms and nitrogen atoms. The fiber aggregate is fabricated by mixing a fiber aggregate that contains fine carbon fibers with boron and heating the fiber aggregate mixed with the boron in a nitrogen atmosphere to transform some of the fine carbon fibers into fine boron nitride fibers.

11 Claims, 6 Drawing Sheets

FIBER AGGREGATE AND FABRICATING METHOD OF THE SAME

CROSS REFERENCE TO RELATED APPLICATION

This application is based on and incorporates herein by reference Japanese Patent Application No. 2008-066137 filed on Mar. 14, 2008.

BACKGROUND OF THE INVENTION

1. Field of the Invention

The present invention relates to a fiber aggregate, which contains fine carbon fibers etc., and a fabricating method of the fiber aggregate.

2. Description of Related Art

Carbon nanotube (hereafter referred to as CNT) is a new carbon material discovered by Sumio Iijima of NEC Corporation in 1991. CNT is a tube-like shaped carbon material having a diameter of several nanometers to several ten nanometers. CNT has a structure in which a graphite sheet having a network of six-membered rings of $sp^2$-bonded carbon atoms is cylindrically wrapped. CNT has a pipe-like shape having a diameter of about 0.5 nm to 10 nm and a length of about 1 μm. It has been confirmed that single-walled nanotubes, each of which has one-atom-thick layer, and multi-walled nanotubes, each of which consists of multiple layers of graphite, exist as CNTs.

CNT has a chemically quite stable structure. It has been confirmed that CNTs exhibit various properties. For example, CNTs can be both of a good conductor and a semiconductor in accordance with a winding inclination of a spiral of hexagonal lattice that forms CNT. Moreover, CNT is excellent in electrical properties, in thermal conductivity and in mechanical strength. Applications of CNT to the fields of thermal equipment, electrical and electric equipment, etc. have been studied actively, taking advantage of these features.

However, due to the microstructure, handleability and processability of CNTs are bad. Thus, there have been attempts to fabricate a material that is formed of CNTs and has a size large enough to be handled under being checked by the naked eye. As examples in which CNTs are used as a raw material, textiles and sheets using CNTs are known. Moreover, there are proposed woven fabrics and sheets in which CNTs are partially or wholly used. In the woven fabrics and the sheets, CNTs are used as constituents of fibers or yarns (fiber aggregates) or as fibers or yarns themselves. Furthermore, there are disclosed technologies for fabricating yarns and sheets using vertically aligned CNTs.

Specifically, CNTs are formed on a substrate to be aligned in a direction perpendicular to the substrate. Then, by peeling and pulling a bundle of the CNTs away from the substrate, the yarns or the sheets are fabricated (see WO2005/102924A1 corresponding to US2008/0095694A1, for example).

It is considered to use the fiber aggregate, which consists of fine carbon fibers such as CNTs fabricated by the above-mentioned well-known technologies, as a conducting wire. The conducting wire features small diameter and light weight.

In order to use the fiber aggregate consisting of fine carbon fibers as a conducting wire, it is necessary to form a surface insulating layer on the fiber aggregate. In order to form the surface insulating layer, commonly an outside of the fiber aggregate is covered with insulating resin.

However, if the fiber aggregate consisting of fine carbon fibers is covered with resin, the diameter of the fiber aggregate is extended and the weight of the fiber aggregate is increased. Accordingly, the resin covering impairs the advantages of the fiber aggregate, i.e., the small diameter and the light weight when the fiber aggregate consisting of the fine carbon fibers is used as a conducting wire.

SUMMARY OF THE INVENTION

The present invention is made in view of the above-mentioned problem. Thus, it is an objective of the present invention to provide a small and lightweight fiber aggregate and a fabricating method of the fiber aggregate.

To achieve the objective of the present invention, there is provided a fiber aggregate that contains fine carbon fibers and fine boron nitride fibers. There is also provided a method for fabricating a fiber aggregate. The method includes mixing a fiber aggregate that contains fine carbon fibers with boron, and heating the fiber aggregate mixed with the boron in a nitrogen atmosphere. By this method, some of the fine carbon fibers are transformed into fine boron nitride fibers that are formed by substituting carbon atoms of the fine carbon fibers by boron atoms and nitrogen atoms.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

Embodiments of the present invention will be described hereafter with reference to the drawings.

The fiber aggregate according to the present invention contains fine carbon fibers and fine boron nitride fibers. The fine boron nitride fibers are fabricated by substituting carbon atoms in fine carbon fibers by boron atoms and nitrogen atoms. Fine boron nitride fibers have electric non-conductance. Therefore, the fiber aggregate according to the present invention has electric non-conductance by its fine boron nitride fibers. Moreover, the fiber aggregate according to the present invention has electric conductivity in its core portion, for example, by its fine carbon fibers.

It is desirable that an outer layer portion of the fiber aggregate according to the present invention is formed of the fine boron nitride fibers. By the outer layer portion of the fiber aggregate, which is formed of the fine boron nitride fibers having electric non-conductance, the core portion (a portion except the outer layer portion) of the fiber aggregate is electrically insulated from outside. Accordingly, the fiber aggregate according to the present invention is suitable for a conducting wire.

It is desirable that the fiber aggregate according to the present invention is formed by twisting fibers, which constitute the fiber aggregate, together. Maximum current density (A/mm$^2$) of the fiber aggregate according to the present invention can be raised by twisting the fibers, which constitute the fiber aggregate, together. The fiber aggregate according to the present invention is an aggregate of fibers that extend in their longitudinal directions. The fiber aggregate includes yarn, wire, rope, etc.

In the fiber aggregate according to the present invention, it is possible to use CNTs, vapor grown carbon fibers (VGCF (registered trademark)), etc. as the fine carbon fibers. CNTs are especially suitable for the fine carbon fibers of the fiber aggregate according to the present invention. In the fiber aggregate according to the present invention, it is desirable that the fine carbon fibers include boron-containing fine carbon fibers. At least a part of carbon atoms of fine carbon fibers is substituted by boron atoms to form boron-containing fine carbon fibers. Boron-containing fine carbon fiber has high electric conductivity. When the fiber aggregate according to the present invention contains boron-containing fine carbon fibers, electric properties of the fiber aggregate such as electric conductivity are further improved. It is desirable that the boron-containing fine carbon fibers are located in the core portion (a portion except the outer layer portion) of the fiber aggregate.

It is desirable that the fine boron nitride fibers are fine fibers that are formed by substituting substantially all of carbon atoms of fine carbon fibers by boron atoms and nitrogen atoms. Moreover, it is desirable that the ratio of the boron atoms to the nitrogen atoms in the fine boron nitride fibers is 1:1.

It is possible to fabricate the fiber aggregate according to the present invention by transforming a part of the fine carbon fibers into the fine boron nitride fibers, for example. A part of the fine carbon fibers can be transformed into the fine boron nitride fibers by mixing fiber aggregate that contains fine carbon fibers with boron and heating the mixture in a nitrogen atmosphere.

Alternatively, it is possible to fabricate the fiber aggregate according to the present invention by transforming a part of the fine carbon fibers into the fine boron nitride fibers and transforming a part of the fine carbon fibers into the boron-containing fine carbon fibers, for example. A part of the fine carbon fibers can be transformed into the fine boron nitride fibers by mixing fiber aggregate that contains fine carbon fibers with boron, and heating the mixture in a nitrogen atmosphere. A part of the fine carbon fibers can be transformed into the boron-containing fine carbon fibers by mixing fiber aggregate that contains fine carbon fibers with boron, and heating the mixture in an inert gas atmosphere, which contains substantially no nitrogen.

Here, it is possible to use elemental boron, boric acid, boron nitride, boron carbide, etc. as boron. By increasing an amount of boron that is mixed with the fiber aggregate that contains the fine carbon fibers, it is possible to promote substitutions of boron atoms for carbon atoms in the fine carbon fibers.

It is desirable to heat the mixture of boron and the fiber aggregate that contains fine carbon fibers to a temperature in a range of 1500° C. to 2000° C., for example, to transform a part of the fine carbon fibers to the fine boron nitride fibers in the nitrogen atmosphere. By the temperature not less than 1500° C., it is possible to sufficiently substitute carbon atoms by boron atoms and nitrogen atoms. By the temperature not more than 2000° C., it is possible to maintain the shape of the fiber aggregate in the heating process.

Moreover, it is desirable to flow nitrogen at a flow rate of 0.02 L/min. to 2 L/min. in heating the mixture of boron and fiber aggregate that contains fine carbon fibers in the nitrogen atmosphere. By increasing the flow rate of nitrogen, it is possible to promote substitutions of boron atoms for carbon atoms in the fine carbon fibers.

It is desirable to heat and sinter the mixture of boron and the fiber aggregate that contains fine carbon fibers to a temperature in a range of 1500° C. to 2000° C., for example, to transform a part of the fine carbon fibers into the boron-containing fine carbon fibers in the inert gas atmosphere. By the temperature not less than 1500° C., it is possible to sufficiently substitute carbon atoms by boron atoms and nitrogen atoms. By the temperature not more than 2000° C., it is possible to inhibit fractures of the fine carbon fibers.

In fabricating the fiber aggregate according to the present invention, it is possible to include a process in which volatile organic solvent is added to the fiber aggregate that contains fine carbon fibers and then the volatile organic solvent is volatilized. By this process, the fine carbon fibers, which constitute the fiber aggregate, cohere with each other by intermolecular forces that act therebetween. Accordingly, it is possible to efficiently substitute carbon atoms of the fine carbon fibers in the outer layer portion of the fiber aggregate by boron atoms and nitrogen atoms in the heating process. Thus, the fine boron nitride fibers are localized in the outer layer portion of the fiber aggregate, for example, and it is possible to improve the electric non-conductivity of the outer layer portion of the fiber aggregate. Here, it is possible to use ethanol, acetone, ethyl acetate, etc. as the volatile organic solvent. As a method for volatilizing the volatile organic solvent, the fiber aggregate is heated, or is dried in the air.

(First Embodiment)

Synthesis of CNTs (fine carbon fibers) will be described hereafter.

Iron was evaporated onto one side surface of a silicon substrate that has a height of 8 mm, a width of 2 mm, a thickness of 1 mm and an area of 16 mm$^2$, to form a coating with a thickness of 1 nm by vacuum deposition, and an activated silicon substrate was obtained. This activated silicon substrate was inserted in an electric furnace, and was heated to 1200° C. Under this condition, methane gas was circulated at a circulation speed of 30 cc/min., hydrogen gas was circulated at a circulation speed of 70 cc/min., and argon gas was circulated at a circulation speed of 400 cc/min. for 5 minutes. As a result, many CNTs were deposited on the silicon substrate. One ends of the deposited CNTs were fixed on the substrate. The CNTs ran uniformly in a direction perpendicular to the substrate. The diameter of each CNT was about 10 nm.

Fabrication of CNT wires (fiber aggregate that contains fine carbon fibers) will be described hereafter.

A wire was fabricated from CNTs by a well-known method (for example, by a method disclosed in paragraphs 0022-0025 of JP2004-107196A, which correspond to paragraphs 0025-

Figure 1:
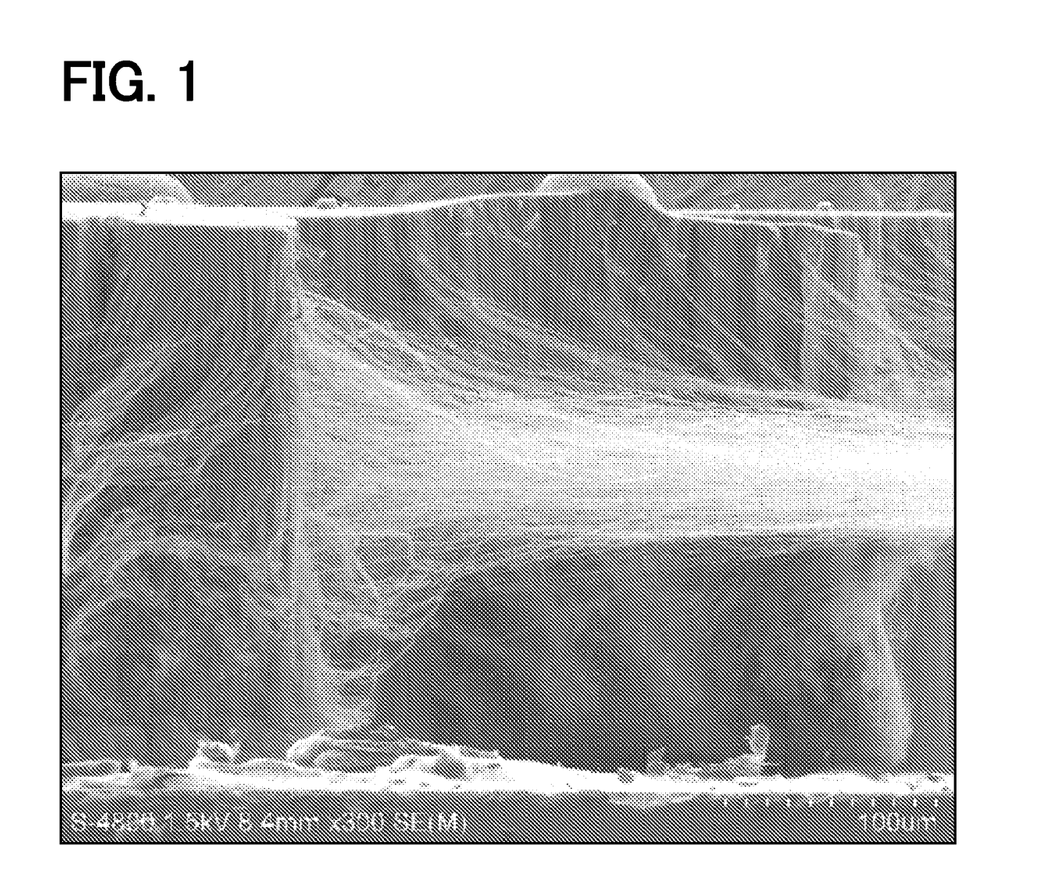
FIG. 1 is a photograph showing a method for fabricating a CNT wire.
Figure 2:
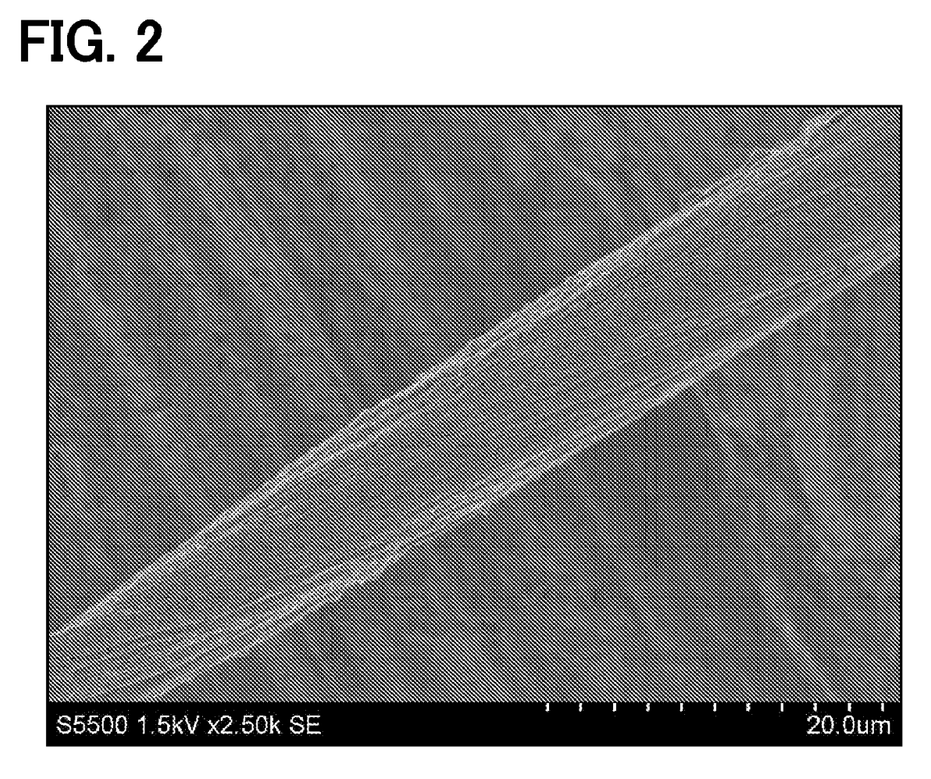
FIG. 2 is an electron micrograph showing a form of the CNT wire.
Figure 3:
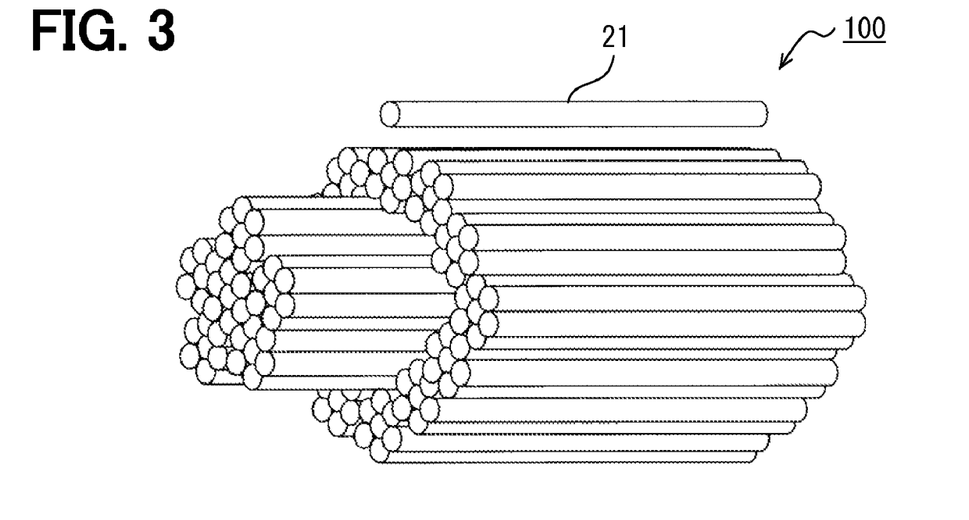
FIG. 3 is a diagram schematically showing structure of an untreated CNT wire.

0032 of US2004/0053780A1). Specifically, as shown in FIG. 1, in a matrix of CNTs that are arrayed on the substrate, one end of a bundle of CNTs is pinched by a tool such as tweezers, and it is drawn out in a direction perpendicular to the extending direction of CNTs. When the bundle of CNTs is drawn out, van der Waals force joins a rear end portion of the drawn-out bundle of CNTs to an end of another bundle of CNTs, which is contiguous to the drawn-out bundle on the substrate. As a result, the bundles of CNTs are connected with each other to form a long wire. As shown in FIG. 1, the bundles of CNTs are pulled out at many points from the matrix of CNTs that are arrayed on the substrate. It is possible to obtain a wire composed of CNTs (hereafter referred to as a CNT wire) by twisting the bundles of CNTs. As shown in a SEM image of FIG. 2 and in a schematic diagram of FIG. 3, the CNT wire 100 is an aggregate of CNTs 21.

Substitution of carbon atoms in CNTs will be described hereafter.

The CNT wires and boric acid were put in a graphite crucible for heating so that the molar ratio of atoms of the CNT wires to boric acid would be 2:1. The CNT wires and the boric acid put in the graphite crucible were heated by a high-frequency induction heating furnace at 2000° C. for 30 minutes in an argon atmosphere of 200 sccm (standard cubic centimeter per minute) and 1.0 atm, and then were naturally cooled down to room temperature. In this process, in a part of CNTs that constitute the CNT wires, at least a part of carbon atoms were substituted by boron atoms to transform the CNTs into boron-containing CNTs.

Figure 4:
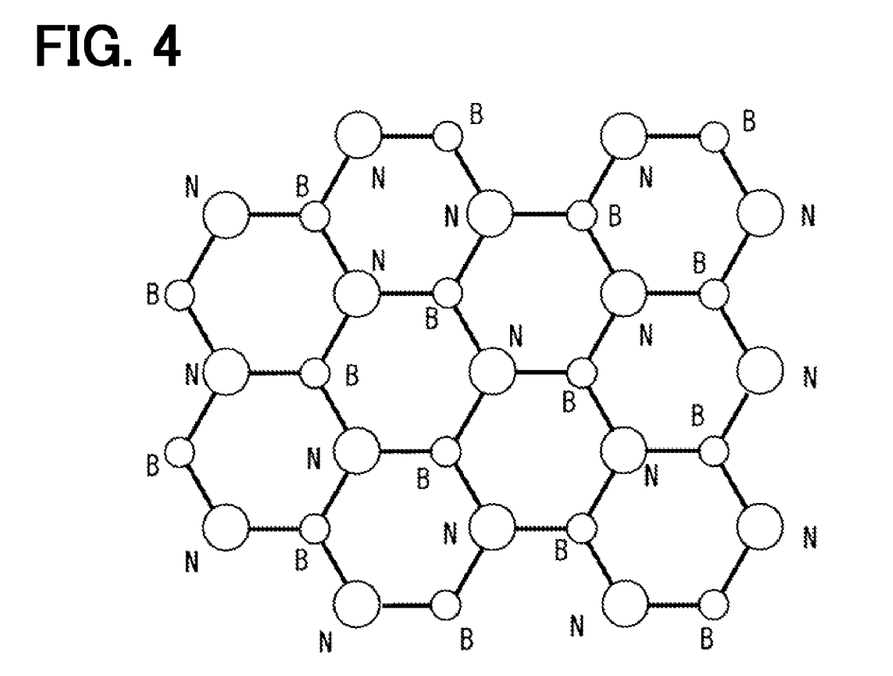
FIG. 4 is an explanatory diagram showing molecular structure of CNT of which carbon is substituted by boron and nitrogen.

The CNT wires and boric acid were taken out from the heat-treated graphite crucible, and the CNT wires and boric acid were put in the graphite crucible for heating again so that the molar ratio of the atoms of the CNT wires to boric acid would be 5:1. The CNT wires and the boric acid in the graphite crucible were heated by the heating furnace at 2000° C. for 30 minutes in a nitrogen atmosphere of 200 sccm and 1.0 atm. In this process, in a part of CNTs that constitute the CNT wires, carbon atoms were substituted by nitrogen atoms and boron atoms to transform the CNTs into boron nitride nanotubes (hereafter referred to as BNNTs) as shown in FIG. 4. In BNNT, which is formed by substituting carbon atoms of CNT by boron atoms and nitrogen atoms, two valence electrons of each nitrogen atom that forms six-membered ring cannot move freely because the electronegativity of nitrogen is high. Therefore, BNNT has electric non-conductance.

In the following description, the CNT wire of which carbon atoms of a part of CNTs are substituted by boron atoms and nitrogen atoms is referred to as a treated CNT wire. The CNT wire of which carbon atoms of CNTs are not substituted is referred to as an untreated CNT wire.

Analysis of the CNT wires will be described hereafter.

As a result of observing structure and composition of a cross section of the treated CNT wire, the diameter of the treated CNT wire was not changed from that of the untreated CNT. Moreover, the weight of the treated CNT wire was not increased from that of the untreated CNT wire.

Figure 5:
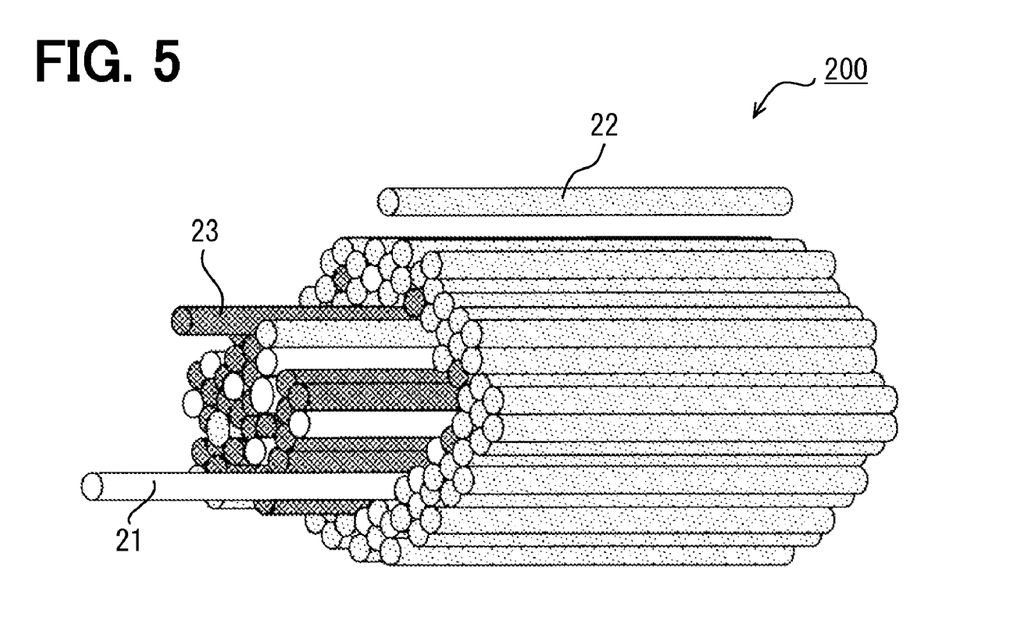
FIG. 5 is a diagram schematically showing structure of a treated CNT wire.
Figure 6:
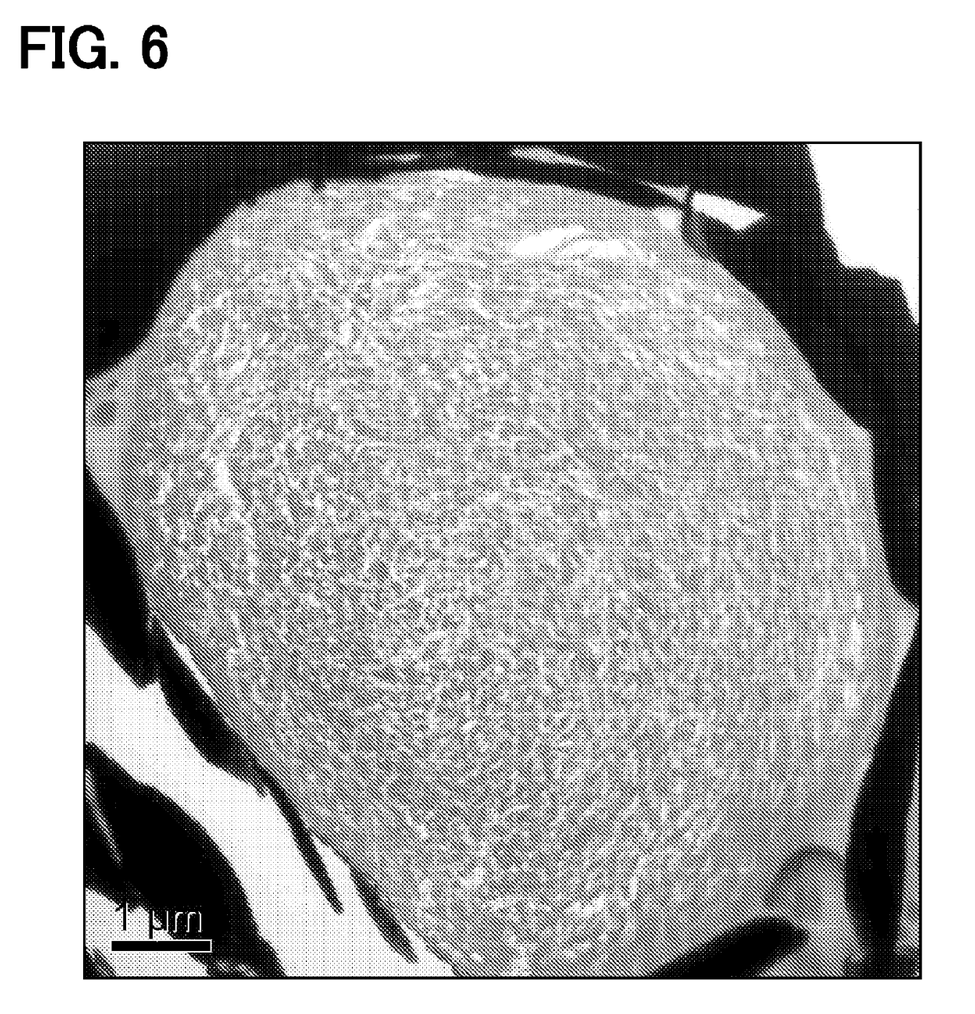
FIG. 6 is a transmission electron micrograph showing a cross section of a CNT wire according to a first embodiment of the present invention.

Moreover, as shown in FIG. 5, it is confirmed that an outer layer portion of the treated CNT wire 200 was covered by BNNTs 22, which are formed by substituting carbon atoms of CNTs by boron atoms and nitrogen atoms. Moreover, a core portion of the treated CNT wire 200 contained both of CNTs 21, of which carbon atoms were not substituted, and boron-containing CNTs 23, which are formed by substituting a part of carbon atoms of CNTs by boron atoms. FIG. 6 is a transmission electron micrograph showing the cross section of the treated CNT wire 200.

Evaluation of properties of the CNT wire will be described hereafter.

Figure 7:
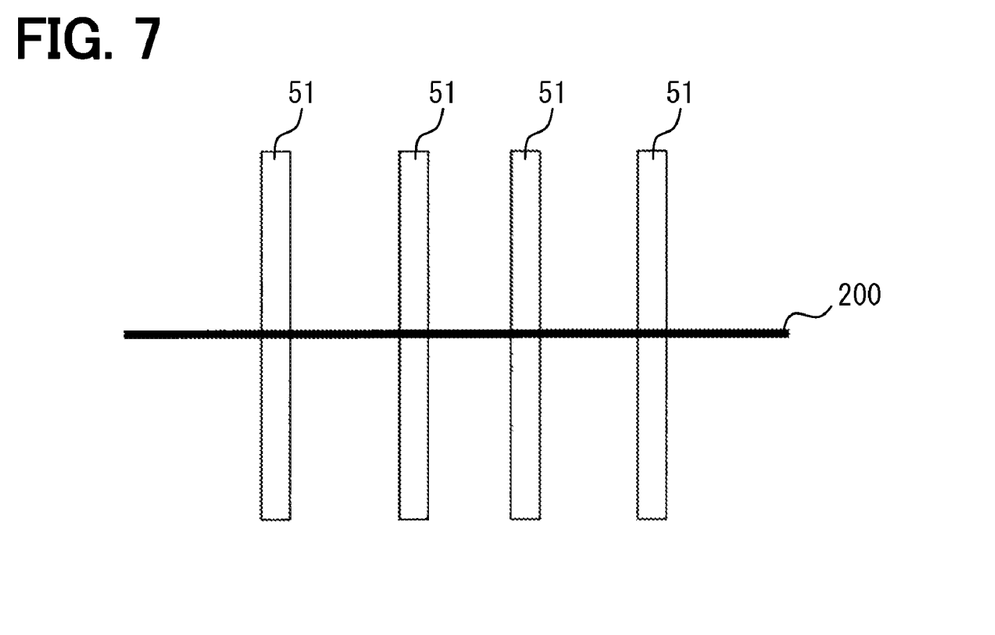
FIG. 7 is an explanatory diagram showing a method for measuring electric resistance of the CNT wire.

As shown in FIG. 7, the treated CNT wire 200 was brought in contact with electrodes 51, and electrical resistance of the treated CNT wire 200 was measured by well-known four-terminal measurement method. The electrical resistance of the treated CNT wire 200 was $10^{11}$ Ω·m. Electrical resistance of the untreated CNT wire was also measured in the same way. The electrical resistance of the untreated CNT wire was $6.0 \times 10^{-5}$ Ω·m.

From this result, it is confirmed that the treated CNT wire had a high electrical insulation performance by forming its outer layer portion by BNNTs, which are formed by substituting carbon atoms of CNTs by boron atoms and nitrogen atoms. Moreover, the treated CNT wire was fabricated by twisting the bundle of CNTs, so that the maximum current density (A/mm$^2$) was especially high when it is used as a conducting wire.

(Second Embodiment)

Fabrication of treated CNT wires will be described hereafter.

Untreated CNT wires were fabricated in an analogous fashion to the first embodiment. These untreated CNT wires were immersed in an ethanol solution. Then, the untreated CNT wires were taken out of the ethanol solution and were dried in the air. Next, the untreated CNT wires and boric acid were put in a graphite crucible for heating so that the molar ratio of atoms of the untreated CNT wires to boric acid would be 2:1. The untreated CNT wires and the boric acid put in the graphite crucible were heated by a high-frequency induction heating furnace at 2000° C. for 30 minutes in an argon atmosphere of 200 sccm and 1.0 atm, and then were naturally cooled down to room temperature. In this process, in a part of CNTs that constitute the untreated CNT wires, at least a part of carbon atoms were substituted by boron atoms to transform the CNTs into boron-containing CNTs. Ethanol that remained in the untreated CNT wires was volatilized by heating.

The CNT wires and boric acid were taken out from the heat-treated graphite crucible, and the CNT wires and boric acid were put in the graphite crucible for heating again so that the molar ratio of the atoms of the CNT wires to boric acid would be 5:1. The CNT wires and the boric acid in the graphite crucible were heated by the heating furnace at 2000° C. for 30 minutes in a nitrogen atmosphere of 200 sccm and 1.0 atm. In this process, in CNTs that constitute an outer layer portion of the CNT wires, carbon atoms were substituted by nitrogen atoms and boron atoms to transform the CNTs into BNNTs. The treated CNT wires were fabricated by the above-described process.

Analysis of the treated CNT wires will be described hereafter.

Figure 8:
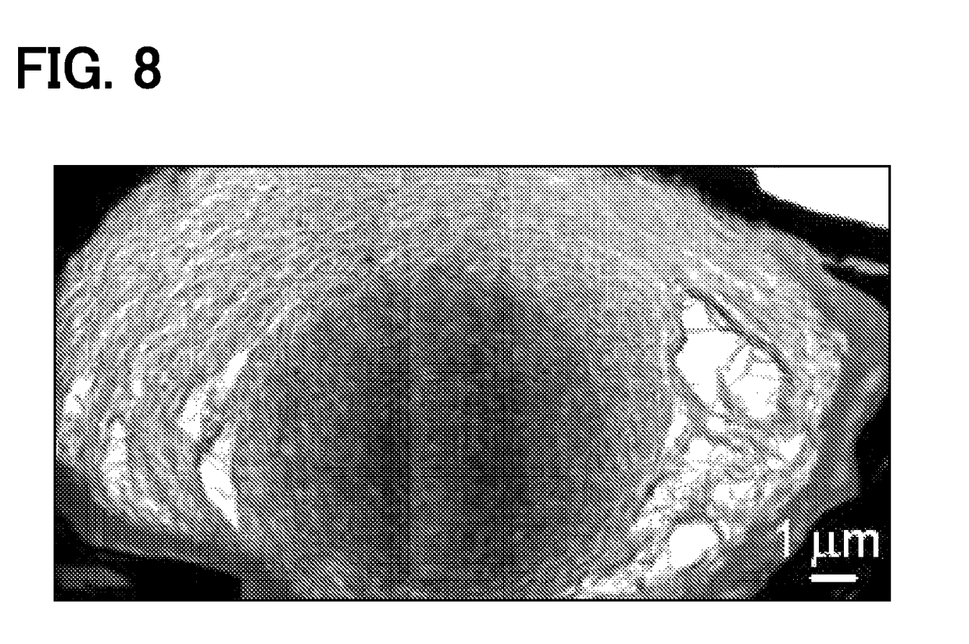
FIG. 8 is a transmission electron micrograph showing a cross section of a CNT wire according to a second embodiment of the present invention.

Structure and composition of a cross section of the treated CNT wire were observed with an analytical electron microscope. FIG. 8 is a transmission electron micrograph showing the cross section of the treated CNT wire. Density of nanotubes in the treated CNT wire fabricated in the second embodiment was still higher than that of the treated CNT wire fabricated in the first embodiment. Nanotubes of the treated CNT wire fabricated in the second embodiment were in more intimate contacts with each other than nanotubes of the treated CNT wire fabricated in the first embodiment. Moreover, the outer layer portion of the treated CNT wire of the first embodiment was partially exfoliated. In contrast, the outer layer portion of the treated CNT wire of the second embodiment was not exfoliated. Furthermore, with respect to the treated CNT wire of the first embodiment, in the treated CNT wire of the second embodiment, the BNNTs, which were formed by substituting carbon atoms of CNTs by boron atoms and nitrogen atoms, were localized exclusively in the outer layer portion of the treated CNT wire, and were hardly found in the core portion of the treated ONT wire. It is considered that this is because nanotubes were tightened and the gaps between nanotubes became lost by the process of immersing the untreated CNT wire in the ethanol solution and drying the immersed untreated CNT wire in the air.

By the structure that BNNTs, which are formed by substituting carbon atoms of CNTs by boron atoms and nitrogen atoms, are localized in the outer layer portion of the treated CNT wire, the electrical insulation performance in the outer layer portion of the treated CNT wire is further improved. Moreover, in the core portion of the treated CNT wire, there are few BNNTs, which are formed by substituting carbon atoms of CNTs by boron atoms and nitrogen atoms. Thus, electrical conductivity in the core portion of the treated CNT wire does not fall.

The diameter of the treated CNT wire fabricated in the second embodiment was not changed from that of the untreated CNT in an analogous fashion to the treated CNT wire of the first embodiment. The weight of the treated CNT wire fabricated in the second embodiment was not increased from that of the untreated CNT wire. The maximum current density ($A/mm^2$) of the treated CNT wire fabricated in the second embodiment was high when it is used as a conducting wire.

The present invention is not limited to the above-described embodiments, and can be put into practice in various modes within the scope of the present invention. For example, instead of CNT, other fine carbon fibers such as vapor grown carbon fiber (VGCF) may be used to fabricate the wire.

Figure 9:
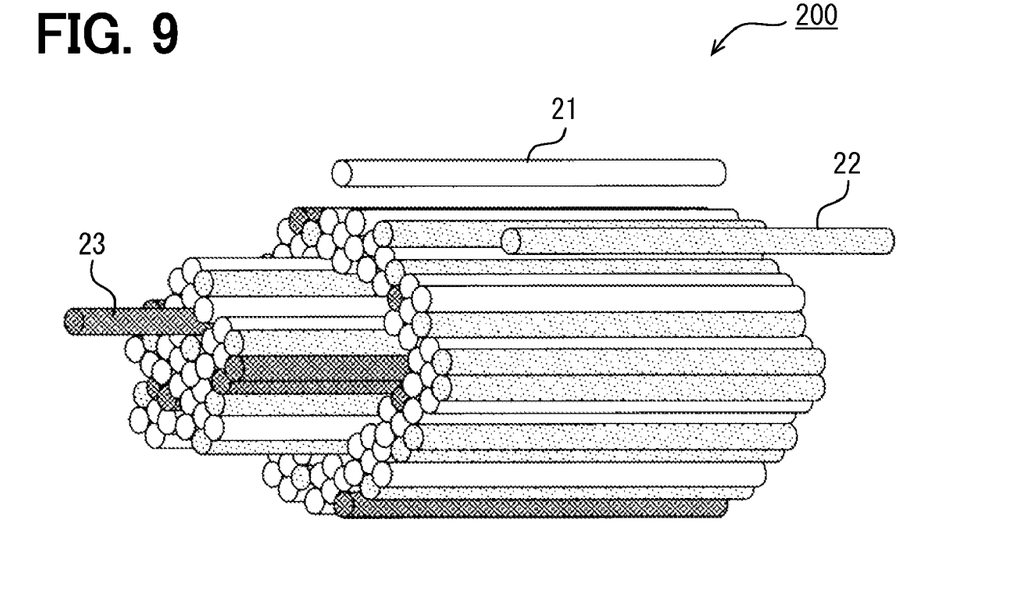
FIG. 9 is a diagram schematically showing structure of another example of the treated CNT wire.
Figure 10:
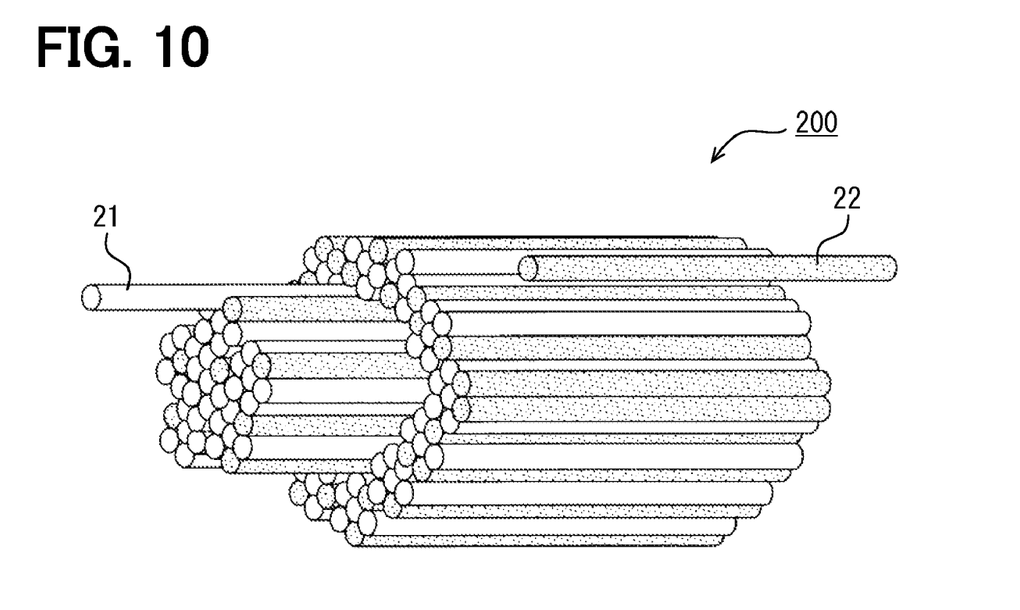
FIG. 10 is a diagram schematically showing structure of still another example of the treated CNT wire.

Moreover, as shown in FIG. 9, in the treated CNT wire 200, BNNTs 22, which is formed by substituting carbon atoms of CNTs by boron atoms and nitrogen atoms, may be distributed not only in the outer layer portion but also in the core portion. Moreover, as shown in FIG. 10, the treated CNT wire 200 may be composed only of CNTs 21, of which carbon atoms are not substituted, and BNNTs 22, which are formed by substituting carbon atoms of CNTs by boron atoms and nitrogen atoms, without containing boron-containing CNTs 23, which are formed by substituting a part of carbon atoms of CNTs by boron atoms.

It is possible to improve an electrical resistance of the above-mentioned treated CNT wire by heat-treating the treated CNT wire at a high temperature (for example, about 2000° C.) in a vacuum or in an inert gas atmosphere. Instead of using ethanol in the second embodiment, it is also possible to use other volatile organic solvents such as acetone and ethyl acetate.

Additional advantages and modifications will readily occur to those skilled in the art. The invention in its broader terms is therefore not limited to the specific details, representative apparatus, and illustrative examples shown and described.

What is claimed is:

1. An electrically conductive carbon wire comprising a fiber aggregate, wherein:
    fine carbon fibers form a core portion of the fiber aggregate; and
    fine boron nitride fibers, which are formed by substituting carbon atoms of the fine carbon fibers by boron atoms and nitrogen atoms, form an outer layer portion of the fiber aggregate.

2. The electrically conductive carbon wire according to claim 1, wherein the fine carbon fibers and the fine boron nitride fibers are twisted with each other.

3. The electrically conductive carbon wire according to claim 1, wherein:
    the fine carbon fibers are carbon nanotubes; and
    the fine boron nitride fibers are boron nitride nanotubes.

4. The electrically conductive carbon wire according to claim 1, further comprising boron-containing fine carbon fibers.

5. The electrically conductive carbon wire according to claim 1, wherein:
    the fine boron nitride fibers are electrically non-conductive; and
    the fine carbon fibers are electrically conductive.

6. The electrically conductive carbon wire according to claim 5, further comprising boron-containing fine carbon fibers included in the core portion and having an electric conductivity.

7. The electrically conductive carbon wire according to claim 6, wherein:
    the fine boron nitride fibers are formed by substituting substantially all of carbon atoms of the fine carbon fibers by boron atoms and nitrogen atoms; and
    a ratio of the boron atoms to the nitrogen atoms in the fine boron nitride fibers is substantially 1:1.

8. A method for fabricating an electrically conductive carbon wire, comprising:
    mixing a fiber aggregate that contains fine carbon fibers with boron;
    first heating the fiber aggregate mixed with the boron in an inert gas atmosphere that does not contain nitrogen to transform some of the fine carbon fibers into boron-containing fine carbon fibers that are formed by substituting carbon atoms of the fine carbon fibers by boron atoms; and
    second heating the fiber aggregate mixed with the boron in a nitrogen atmosphere to transform some of the fine carbon fibers into fine boron nitride fibers that are formed by substituting carbon atoms of the fine carbon fibers by boron atoms and nitrogen atoms,
    wherein the second heating is different from the first heating.

9. The method according to claim 8, wherein:
    the inert gas atmosphere is argon atmosphere;
    the first heating forms a core portion including the fine carbon fibers and the boron-containing fine carbon fibers both being electrically conductive; and
    the second heating forms an outer layer portion including the fine boron nitride fibers being electrically non-conductive and localized exclusively in the outer layer.

10. The method according to claim 9, wherein:
    the fine boron nitride fibers are formed by substituting substantially all of carbon atoms of fine carbon fibers by boron atoms and nitrogen atoms; and
    a ratio of the boron atoms to the nitrogen atoms in the fine boron nitride fibers is substantially 1:1.

11. A method for fabricating a fiber aggregate, comprising:
    mixing a fiber aggregate that contains fine carbon fibers with boron; and
    heating the fiber aggregate mixed with the boron in a nitrogen atmosphere to transform some of the fine carbon fibers into fine boron nitride fibers that are formed by substituting carbon atoms of the fine carbon fibers by boron atoms and nitrogen atoms;
    adding volatile organic solvent to the fiber aggregate; and
    volatilizing the volatile organic solvent from the fiber aggregate.

* * * * *